United States Patent [19]
Schmidt et al.

[11] Patent Number: 5,522,564
[45] Date of Patent: Jun. 4, 1996

[54] SAFETY BELT REELING DEVICE AND SAFETY BELT TIGHTENING DEVICE COMBINATION WITH POWER LIMITER

[75] Inventors: Thomas Schmidt, Timmendorfer Strand; Doris Kröger, Tornesch; Frank Fugel, Hamburg; Klaus Butenop, Herzhorn, all of Germany

[73] Assignee: Autoliv Development AB, Vargarda, Sweden

[21] Appl. No.: 306,503

[22] Filed: Sep. 13, 1994

[30] Foreign Application Priority Data

Sep. 13, 1993 [DE] Germany .......................... 43 31 027.3

[51] Int. Cl.⁶ ............................. B60R 22/28; B60R 22/46
[52] U.S. Cl. ........................................ 242/374; 242/379.1
[58] Field of Search ............................... 242/374, 379.1; 280/805, 806; 297/470–472

[56]  References Cited

U.S. PATENT DOCUMENTS 5,344,095  9/1994  Frei ........................................... 242/374

FOREIGN PATENT DOCUMENTS 1913448  9/1970  Germany .
2026277  12/1971  Germany .
2419937  11/1975  Germany .
3407378  11/1985  Germany .
3715846  12/1988  Germany .
4209540  9/1993  Germany .
4227781  2/1994  Germany .

Primary Examiner—John M. Jillions
Attorney, Agent, or Firm—Robert W. Becker & Associates

[57]  ABSTRACT

A self-locking safety-belt reeling device has a reeling shaft on which a safety-belt is wound. A blocking device that is controlled by at least a vehicle-sensitive control mechanism and/or a safety-belt-sensitive control mechanism for blocking the safety-belt reeling shaft is provided. A tightening device acting on the reeling shaft comprises a tightener coupling. The tightening device further has a drive disk. The drive disk, upon activation of the tightening device, is driven in rotation by a drive device and coupled with the tightener coupling to the reeling shaft. A power limiter is connected to the safety-belt reeling device for limiting removal of the safety belt, whereby the power limiter is activated and deactivated depending on the operational states of the safety-belt reeling device and the tightening device. The power limiter during blocking of the safety belt reeling device is inactive and is activated only after completion of a tightening movement of the safety belt. Preferably, the power limiter is a torsion rod.

26 Claims, 6 Drawing Sheets

SAFETY BELT REELING DEVICE AND SAFETY BELT TIGHTENING DEVICE COMBINATION WITH POWER LIMITER

BACKGROUND OF THE INVENTION

The present invention relates to a self-locking safety belt reeling device with a vehicle-sensitive and/or belt-sensitive controllable blocking device and with a tightening device acting on the safety-belt reeling shaft, comprised of a drive disk which is to be driven in rotation by a drive device, which drive disk, upon activation of the tightening device can couple via a tightener coupling with the safety-belt reeling shaft.

A safety belt reeling device of the aforementioned kind including a coordinated tightening device is known from German Offenlegungsschrift 34 07 378. In the known device the safety-belt reeling shaft can be coupled with a clutch disk connected thereto to a cable pulley (drive disk) from which cable pulley a cable can be removed by a pyrotechnical linear piston drive. Upon rotation of the cable pulley a radially pivotable pawl is pivoted outwardly and engages the clutch disk connected to the safety-belt reeling shaft. After completion of the tightening movement a return movement of the safety-belt reeling shaft by a small amount in the direction of removal of the safety-belt results in a direct pivoting of the locking member of the self-locking safety belt reeling device so that upon further load resulting from removal of the safety-belt the safety-belt reeling shaft is blocked and no further removal of safety-belt is possible.

Following the blocking of the safety-belt reeling device as a consequence of the tightening step it is possible that considerable forces result when the person using the safety-belt is forced into the safety-belt due to acceleration or deceleration forces acting on the body and there is a risk of being injured by the safety-belt upon being retaining therein. Especially in connection with an airbag which during an accident additionally buffers a forward movement of the passenger buckled in with the safety-belt, it is now desirable that to a certain extent, even after actuation of the safety-belt reeling device and blockage of the further removal of the safety-belt, a certain amount of forward movement of the person buckled in should be possible. This forward movement can be used in connection with the blockage of the safety-belt reeling device and the subsequent loading by the body of the passenger in order to reduce power peaks, respectively, to dampen the retaining impact.

A power limiting device for a safety-belt is already known from German Offenlegungsschrift 20 26 277. In the known device the power limiting device is in the form of a torsion rod. The torsion rod is integrated into the safety-belt reeling device. However, in the prior art the reeling device is a simple storage device for the safety-belt without its own winding or locking device. The torsion rod is on the one hand connected to the housing of the safety-belt reeling device connected to the vehicle and on the other hand to the shaft that supports the wound safety-belt. During loading upon removal of the safety-belt from the shaft the rotation of the shaft is braked by the torsion rod and the force level is lowered. A corresponding device is also known in conjunction with a self-locking safety-belt reeling device from German Patent 20 47 842. In these prior art devices, however, a functional connection to the tightening device integrated into the safety-belt reeling device is not present. It should be noted in this context that the tightening device may not drive the shaft of the safety-belt reeling device via the power limiting device because for powerful tightening devices the power limiting device may already be activated during safety-belt tightening.

It is therefore an object of the present invention to provide a safety-belt reeling device of the aforementioned kind that includes a tightening device and with which it is possible to allow for a limited forward movement of the person buckled in depending on an operational condition in order to reduce occurring high loads.

SUMMARY OF THE INVENTION

A self-locking safety-belt reeling device according to the present invention is primarily characterized by:

A reeling shaft on which a safety-belt is wound;

A blocking device controlled by at least one control mechanism selected from the group consisting of a vehicle-sensitive control mechanism and a safety-belt-sensitive control mechanism for blocking the reeling shaft;

A tightening device acting on the reeling shaft, a tightening device comprises a tight nut coupling;

The tightening device further comprising a drive disk, the drive disk, upon activation of the tightening device, driven in rotation by a drive device and coupled with the tightener coupling to the reeling shaft; and A power limiter connected to the reeling device for limiting removal of the safety belt, the power limiter being activated and deactivated depending on operational states of the safety-belt reeling device and the tightening device.

Preferably, the power limiter during blocking of the safety-belt reeling shaft is inactive and is activated only after completion of a tightening movement of the safety belt.

Preferably, the power limiter is a torsion rod with a first and a second end.

Advantageously, the safety-belt reeling device further comprises a coupling device for coupling the reeling shaft in the first end of the torsion rod, wherein the blocking device comprises a locking member and wherein the second end of the torsion rod is operatively connected to the locking member.

Expediently, the safety-belt reeling device further comprises a hollow shaft surrounding the torsion rod, wherein the second end of the torsion rod is fixedly connected to the hollow shaft and wherein the coupling device is a centrifugal coupling positioned between the hollow shaft and the reeling shaft.

In a preferred embodiment of the present invention, the locking member is coupled to the torsion rod or, in an alternative embodiment, to the hollow shaft.

Expediently, the coupling device is comprised of a ring having an outer toothing, the ring positioned on the hollow shaft, and a pivotable pawl connected to the reeling shaft so as to be positioned in a same plane as the ring with the outer toothing.

Advantageously, under normal blocking conditions the pawl engages in an engaged position the outer toothing of the ring and upon rotational acceleration of the reeling shaft, occurring during a tightening movement of the safety-belt, the pivotable pawl is moved into a disengaged position relative to the outer toothing of the ring.

In a preferred embodiment of the present invention, the safety-belt reeling device further comprises a spring with a dead center point connected to the pivotable pawl for biasing the pivotable pawl into engagement with the outer toothing of the ring. The spring maintains the pivotable pawl in the disengaged position after surpassing the dead center point when the pivotable pawl is pivoted radially outwardly out of engagement with the outer toothing of the ring.

Advantageously, the pivotable pawl in the engaged position has minimal play.

In another preferred embodiment of the present invention, the drive device is a linear tightener comprising a piston drive with a driving cable, the driving cable wound onto the drive disk and unwound from the disk with the piston drive upon actuation. Preferably, between the drive disk and the reeling shaft the tightener coupling is arranged. The tightener coupling comprises a clutch disk fixedly connected to one end of the reeling shaft. The first end of the torsion rod is fixedly connected to the clutch disk in this embodiment and the coupling device is arranged between the hollow shaft and the clutch disk.

Preferably, after a limited safety-belt removal in conjunction with the load exerted on the power limiter, the power limiter is deactivated by rewinding the safety-belt and thereby controlling the coupling device.

Preferably, the tightening device comprises a housing and a control ring rotatably connected within the housing so as to be positioned within a plane of the pivotable pawl connected to the clutch disk, the control ring having an inner toothing cooperating with the pivotable pawl. The inner toothing has ramps slanted in a direction of winding of the safety belt.

Expediently, the inner toothing of the control ring cooperates with the pivotable pawl such that the pivotable pawl in the direction of winding rests at the inner toothing of the control ring, whereby the spring has not yet reached the dead center point.

Expediently, the pivotable pawl has an outer side facing the control ring whereby the outer side has a tooth which in the direction of winding moves along the inner toothing and in a removal direction of the safety-belt engages a tooth of the inner toothing of the control ring.

Preferably, the control ring comprises a cable drum to which a cable is connected with one end, the cable being stored as a cable reserve, wherein a length of the cable in the cable reserve is equivalent to a maximum number of rotations of the torsion rod.

Preferably, the safety belt reeling device further comprises a locking ring connected to the reeling shaft with ear pins. The device preferably also comprises a lever controlled by the tension of the cable for locking the locking ring relative to the reeling shaft when rotating. The locking ring has a guide for a control pin connected to the pivotable pawl.

Preferably, the tightener coupling between the drive disk and the clutch is disengaged upon completion of the tightening movement in a tightening direction such that a return of the clutch disk counter to the tightening direction is possible over an extended path.

Advantageously, the drive device is a pyrotechnical linear tightener comprising a piston drive with a driving cable, the driving cable wound onto the drive disk and unwound from the drive disk with the piston drive upon actuation, wherein between the drive disk and the clutch disk the tightener coupling in the form of a coupling pawl in arranged. The drive disk in this embodiment is axially displacable relative to the clutch disk when the coupling pawl engages the clutch disk.

In another embodiment of the present invention, the safety belt reeling device further comprises a bushing with an outer thread, having threads of a trapezoidal cross-section, wherein the drive disk comprises an inner thread and is connected to the outer thread of the bushing such that the bushing is turnable in a direction of removal of the drive cable and is fixed counter to the direction of removal.

Preferably, the drive disk is connected to the bushing and is prestressed by a pressure spring into a coupling plane of the clutch disk.

Advantageously, the drive device is a linear tightener comprising a piston drive with a driving cable wound onto the drive disk and unwound from the drive disk with the piston drive upon actuation, wherein between the drive disk and the clutch disk of the reeling shaft the tightener coupling is arranged. The piston drive comprises a piston comprised of a guide part and a clamping part for the drive cable. Preferably, the guide part and the clamping part are releasable from one another upon pulling the drive cable counter to the tightening movement such that the drive cable is released from the piston.

In another embodiment of the present invention, the drive device is a linear tightener comprising a piston drive with a driving cable, the driving cable wound onto the drive disk and unwound from the drive disk with the piston drive upon actuation, wherein between the drive disk and the clutch disk of the reeling shaft the tightener coupling is arranged. The tightener coupling comprises a coupling pawl that is pivotable radially into engagement into a corresponding inner toothing of the clutch disk, wherein a spring is connected to the coupling pawl for returning the coupling pawl into a release position for the clutch disk. The spring is activated upon rotating the drive disk counter to a direction of removal of the drive cable.

Preferably, the drive device is a linear tightener comprising a piston drive with a driving cable, the driving cable is wound onto the drive disk and unwound from the drive disk with the piston drive upon actuation, wherein between the drive disk and the clutch disk of the reeling shaft the tightener coupling is arranged. The device in this embodiment further comprises a spring-loaded cutting blade for the drive cable. The cutting blade cuts the cable upon winding the drive cable.

Advantageously, the drive device is a linear tightener comprising a piston drive with a driving cable, the driving cable wound onto the drive disk and unwound from the drive disk with the piston drive upon actuation. Between the cable pulley and the reeling shaft the tightener coupling is arranged. The tightener coupling comprises a clutch disk fixedly connected to the safety belt reeling shaft. The clutch disk is in the form of a projection of the safety-belt reeling shaft that surrounds the cable pulley. Between the projection and the torsion rod an intermediate ring is positioned that connects the projection and the torsion rod so as to be non-rotatable relative to one another.

Preferably, upon reaching a maximum number of rotation of the torsion rod the torsion rod is deactivated via the coupling device.

The present invention is based on the principle that the self-locking safety-belt reeling device is provided with a power limiter for a limited removal of the safety belt which power limiter can be switched on or off as a function of the operational states of the safety-belt reeling device and/or the tightening device. This has the advantage that in the individual operational states of the safety-belt reeling device including a tightening device (i.e., normal blocking without activation of the tightening device, activation and action of the tightening process, as well as further functional safety after completion of the tightening process) the power limiter is switched on or off in order to ensure the functional safety of the safety-belt reeling device with tightening device even for limited allowable forward movements of the person secured by the safety-belt.

According to one embodiment of the present invention the power limiter for a limited safety-belt removal is only active after completion of the tightening movement whereby the power limiter during normal blockage of the self-locking safety-belt reeling device is switched off, but is switched on by the tightening movement. This has the advantage that when an accident occurs, which has not yet activated the tightening device, the power limiter is not yet activated and thus inactive because in such a scenario a limited forward movement of the person buckled in is not desired. Only when the safety-belt is positioned tightly about the body of the person, such a forward movement is allowed, which means that the power limiter should only be switched on after completion of the tightening movement.

According to another embodiment of the present invention, the power limiter is in the form of a torsion rod, as is in principle known from German Offenlegungsschrift 20 26 277.

According to another embodiment of the present invention the torsion rod is connected on the one hand to the locking member of the blocking device of the safety-belt reeling device and on the other hand to the reeling shaft of the safety-belt reeling device whereby between torsion rod and safety-belt reeling shaft a coupling device is provided that can be activated by the tightening movement. In this manner, the switching, respectively, activation and deactivation of the torsion rod forming the power limiter is ensured. For embodying this coupling it is suggested according to one embodiment of the present invention that the torsion rod is arranged within a hollow shaft and is connected fixedly to the hollow shaft at the side facing the locking member of the blocking device whereby the coupling device which is activated by the tightening movement is formed as a centrifugal coupling arranged between the reeling shaft and the hollow shaft. In alternative embodiments the locking member of the safety belt reeling device can be coupled either to the torsion rod or to the hollow shaft.

The coupling device between the hollow shaft and the reeling shaft according to one embodiment of the invention is provided in the form of a ring which has an outer toothing and is arranged on the coupling side of the hollow shaft whereby in the corresponding plane one or more pivotable pawls are supported on the reeling shaft. The pivotable pawl during the normal blocking operation of the self-locking safety-belt reeling device can be in engagement with the outer toothing of the ring and can be brought into disengagement due to the rotational acceleration of the reeling shaft during tightening movements of the safety-belt.

The effectiveness of the coupling device according to one embodiment of the present invention can be ensured such that at the pivotable pawl a spring is provided that forces the pivotable pawl into engagement with the toothed ring and maintains the pivotable pawl in its disengaged position relative to the outer toothing of the ring upon pivoting outwardly and surpassing its dead center point.

According to another embodiment of the present invention it is suggested that the pivotable pawl in its engaged position with the outer toothing of the ring is provided with little play relative to the outer toothing of the ring such that the pivotable pawl, when a tightening movement occurs, can be decoupled or disengaged from the outer toothing of the ring due to the centrifugal force resulting from the tightening movement so as to easily overcome the dead center point of the spring. Small loads on the safety-belt, for example loads occurring during normal operation of the safety-belt reeling device, are transmitted in this embodiment via the torsion rod while at greater loads the pivotable pawl or pawls abut the outer toothing of the ring due elastic deformation of the components, especially of the torsion rod.

Inasmuch as the embodiments of the present invention are based on the disclosure of the tightener coupling according to German Offenlegungsschrift 34 07 378 comprising a drive disk and a clutch disk with a radial locking pawl positioned therebetween, it is suggested that the clutch disk is positioned axially adjacent to the reeling shaft and is connected thereto, that the torsion rod is connected fixedly to the clutch disk, and that the coupling pawl is positioned between the hollow shaft and the clutch disk.

As an alternative to the aforedescribed embodiment, the safety-belt reeling shaft is provided with a unitary projection to form the clutch disk whereby the projection surrounds the coupling plane of the drive disk and between the projection and the torsion rod an intermediate ring is arranged which connects the torsion rod and the projection so as to be non-rotatable.

The inventive safety-belt reeling device may also be embodied such that the safety-belt reeling device, after an accident has occurred (i.e., after activation of the tightening device and loading of the power limiter) remains still functional as a safety-belt reeling means such that the passengers after the accident are still able to move the vehicle while being buckled up. For this purpose, the invention suggests in a further embodiment of the present invention that subsequent to a limited safety-belt removal in conjunction with a load on the power limiter by deactivating the coupling via the subsequent winding movement of the safety-belt the power limiter is switched off.

A further aspect of the present invention is to ensure that the torsion rod is not subjected to overloads as a power limiter so that the allowed limited forward movement of the passenger is not too great. Accordingly, the invention suggests in a further embodiment that upon reaching a maximum rotational value of the torsion rod the torsion rod as a power limiter is switched off by controlling the coupling.

In one of the embodiments for realizing the aforementioned two aspects of the present invention, it is suggested that in the plane of the pivotable pawl connected to the clutch disk of the reeling shaft a control ring with an inner toothing cooperating with the pivotable pawl is provided in the housing of the tightening device so as to be rotatable counter to a certain resistance, for example, a frictional resistance. The inner toothing of the control ring is provided with ramps slanted in the direction of winding. This inner toothing of the control ring can project into the range of movement of the pivotable pawl that the pivotable pawl in the winding direction rests at the inner toothing of the control ring whereby the spring has not yet overcome its dead center point. It can furthermore be provided that the pivotable pawl has a further tooth at its outer side facing the control ring which in the winding direction of the safety-belt reeling shaft can pass along the inner toothing of the control ring and in the removal direction of the safety-belt reeling device can engage a corresponding tooth of the inner toothing of the control ring so as to entrain the control ring.

With the aforedescribed features a coupling action is disclosed that after loading of the safety belt reeling device with tightening device and also of the power limiting device (power limiter) providing for the limited safety-belt removal during an accident by rotating the reeling shaft in the winding direction, the form-locking connection between the reeling shaft and the hollow shaft is again provided by the pivotable pawl so that the power limiting device is turned off, when after an accident the passenger or driver buckles up again and removes the safety belt further.

When the invention is embodied such that only a maximum number of rotations for the torsion rod is allowed in order to protect the torsion rod against overloads, according to another embodiment of the present invention the control ring is connected to a cable pulley with a cable wound thereon whereby the length of the cable reserve provided by the wound cable corresponds to the maximum number of revolutions of the torsion rod. Furthermore, it can be provided that to the reeling shaft a locking ring is connected with shear pins. The locking ring can be locked in its position relative to the rotatable safety-belt reeling shaft with a lever that is controlled by the tension of the cable. The locking ring is provided with a guide for a control pin provided at the pivotable pawl.

In this disclosed embodiment the rotation of the torsion rod unwinds the cable reserve so that at the end of the preset torsional travel the cable is tensioned. This cable tension is used in conjunction with a corresponding guide for the active control of the pivotable pawl in engagement with the hollow shaft. Due to the reestablished coupling upon a further load of the safety-belt in the removal direction, which under certain circumstances could result in breakage or shearing of the torsion rod and thus to a too great forward movement, the torsion rod as a power limiter is switched off.

A further aspect of the present invention is that subsequent to a tightening movement a rotation of the reeling shaft in removal direction of the safety-belt for the allowed forward movement of the passenger takes place and this rotation of the reeling shaft in the removal direction returns the drive device of the tightening device into its initial position. When in this case there is not enough length of drive cable provided within the tightening device, the power limiting device, respectively, the limited forward movement cannot be used. It is thus suggested in another embodiment of the present invention that coupling between the drive disk of the tightening device and the clutch disk of the safety-belt reeling shaft can be released upon completion of the tightening movement so that a return of the clutch disk, respectively, of the safety-belt reeling device counter to the tightening direction is possible over an extended travel distance.

According to a first embodiment with a tightener coupling according to the disclosure of German Offenlegungsschrift 34 07 378, it is suggested that the drive disk can be displaceable in the axial direction at a distance to the clutch disk of the reeling shaft when the coupling pawl engages the clutch disk. This is realized according to the inventive embodiment by providing the drive disk with an inner thread that cooperates with the outer thread of a bushing. The bushing has threads of a trapezoid cross-section. In the removal direction of the driving cable from the drive disk the bushing is rotatable and is fixed counter to the removal direction.

As an alternative it is suggested that the piston of the piston drive of the tightening device is embodied in two parts, a guide part and a clamping part for the drive cable. The guide part and the clamping part, upon pulling the drive cable counter to the tightening direction, can be released from one another so that the driving cable is released from the piston. In this case, a further rotation of the safety-belt reeling shaft in the removal direction is possible.

According to another embodiment of the present invention it is suggested that the coupling between the reeling shaft and the drive cable disk is released such that the coupling pawl of the tightener coupling can be returned by a spring into the release position for the clutch disk of the reeling shaft whereby the spring can be activated by rotation of the drive disk counter to the removal direction of the drive cable.

In a further alternative it is suggested that a spring-loaded cutting blade for the driving cable is provided within the housing of the tightening device whereby the cutting blade can be activated upon rotation of the cable disk counter to the removal direction of the driving cable.

BRIEF DESCRIPTION OF THE DRAWINGS

The object and advantages of the present invention will appear more clearly from the following specification in conjunction with the accompanying tables, in which.

DESCRIPTION OF PREFERRED EMBODIMENTS

The present invention will now be described in detail with the aid of several specific embodiments utilizing FIGS. 1 through 6.

Figure 1:
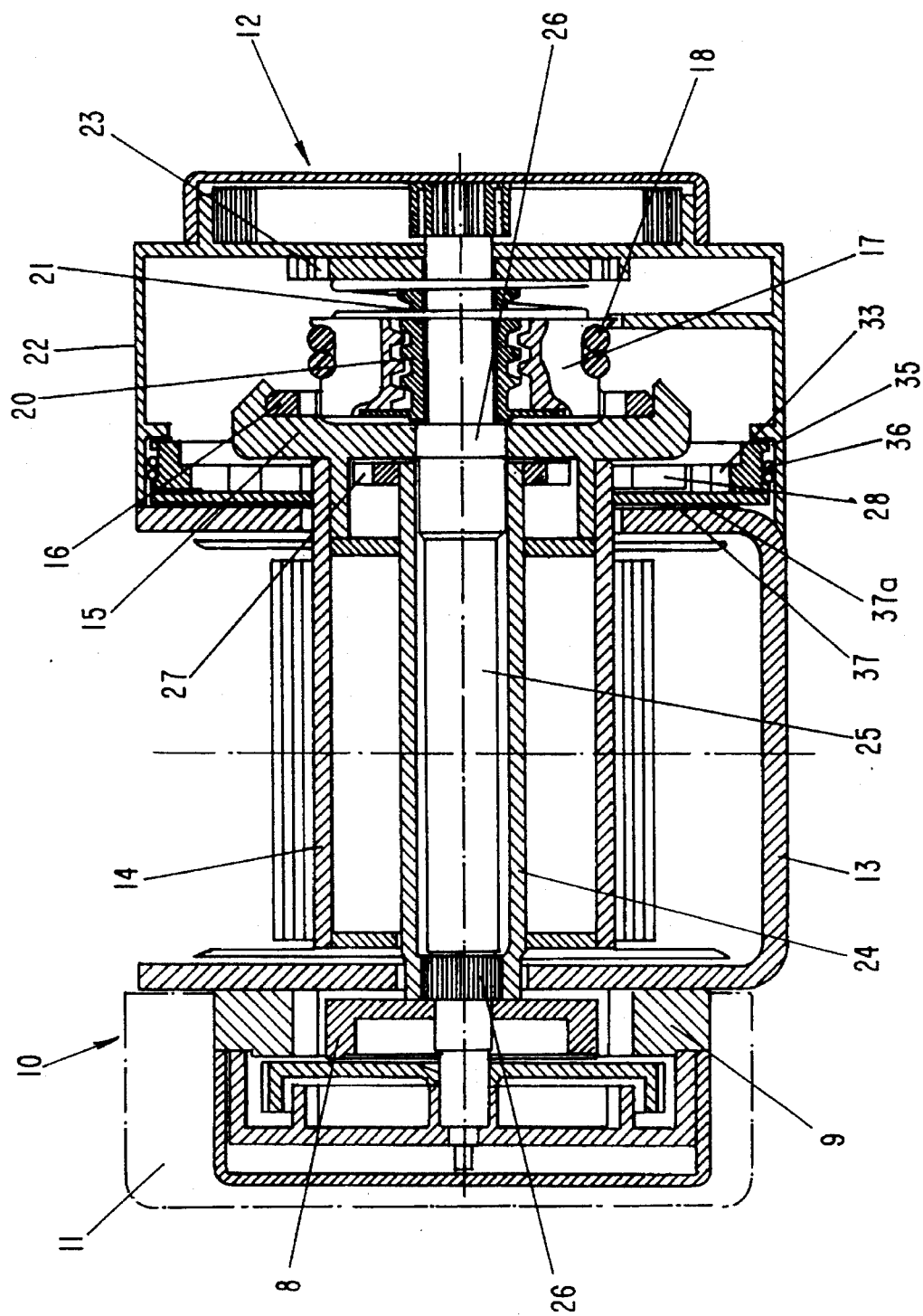
FIG. 1 shows the inventive safety-belt reeling device with tightening device and integrated force limiting device in a sectional frontal view.

The safety-belt reeling device 10 shown in FIG. 1 comprises a blocking device 11 and a tightening device 12 with an incorporated tightener coupling. The function of the safety-belt reeling device and its blocking device corresponds to the prior art and is not of any consequence for the disclosed invention so that a further description is not needed. The safety-belt reeling device is provided at its blocking mechanism 11 with a toothing 9 connected fixedly to the housing which is engaged by a locking member 8 that is radially pivotable. The U-shaped housing 13 of the safety belt reeling device 10 encloses a safety-belt reeling shaft 14 which is rotatably supported therein. To the safety-belt reeling shaft 14 a clutch disk 15 is fixedly connected on the side of the device comprising the tightening device 12. The clutch disk 15 is provided with an inner toothing 16 within its coupling plane.

Figure 4:
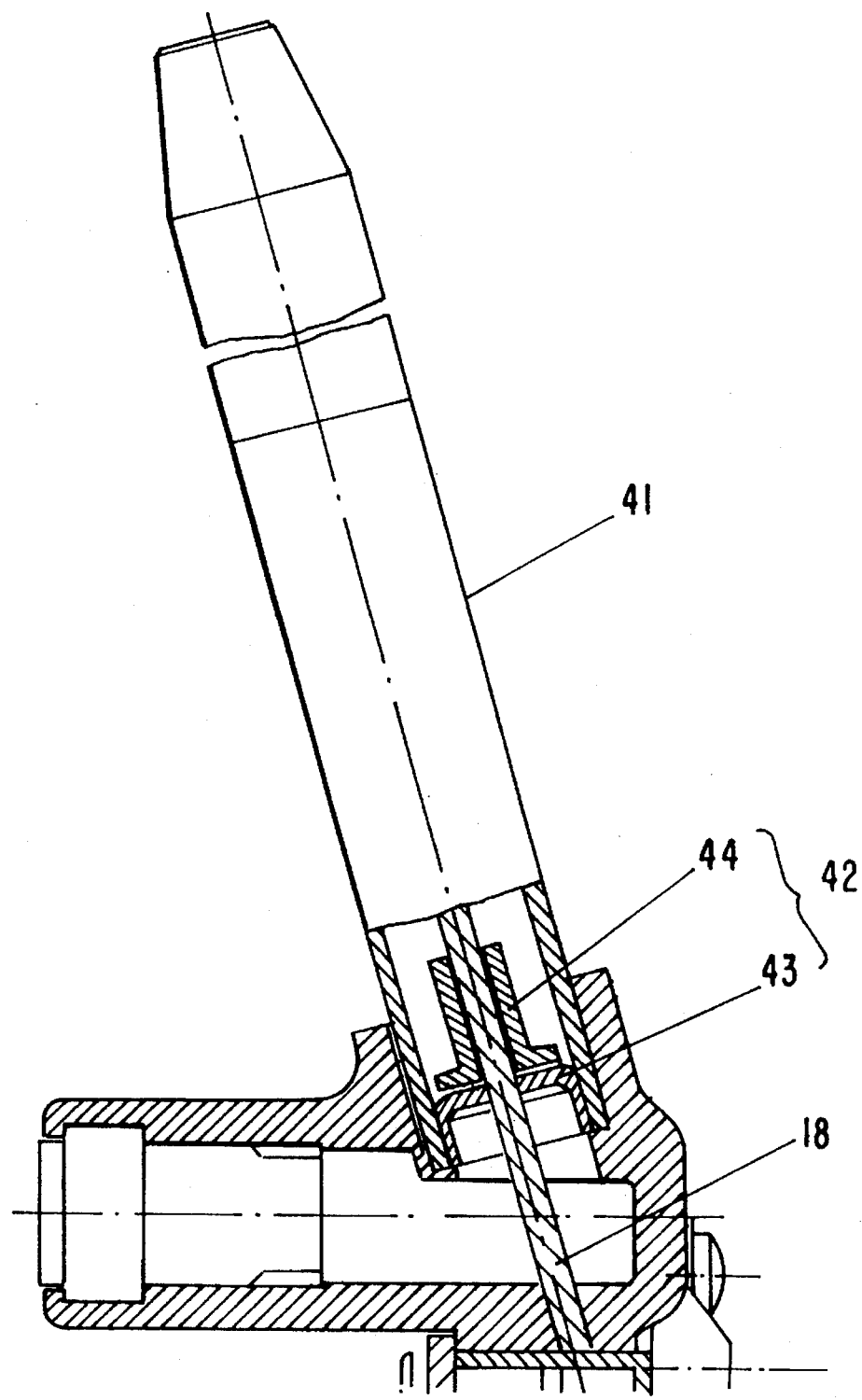
FIG. 4 shows the inventive safety-belt reeling device with tightening device together with the piston drive in section.

For embodying the tightener coupling a drive disk 17 is positioned axially adjacent to the clutch disk 15 of the reeling shaft 14 onto which a driving cable 18 is wound. The driving cable 18 is guided out of the housing of the tightening device 12 and extends to a drive device (piston drive) comprising a cylinder and a piston (FIG. 4). The drive or cable disk 17 is provided with a coupling pawl 19 (FIG. 5 and 6) that is radially displaceable in order to engage the inner toothing 16 of the clutch disk 15. The function of this tightening coupling is disclosed in German Offenlegungsschrift 34 07 378, the disclosure of which is herewith incorporated by reference.

In order to be able to disengage the coupling between the tightening device and the reeling shaft 14 in certain operational stages, the drive disk 17 is rotatably supported on bushing 20 with an inner thread that cooperates with an outer thread of the bushing 20. The outer threads have a trapezoidal cross-section. The bushing 20 is rotatable only in the direction of tightening, i.e., in the removal direction of the driving cable 18 from the drive disk 17, while in the counter direction it is locked. For this purpose a housing lid 22 of the tightening device 12 is provided at its inner side with a ratchet 23 which ratchet 23 locks the rotational movement of the bushing 20 counter to the tightening direction. The drive disk 17 is prestressed with a pressure spring 21 into the coupling plane defined by the inner toothing 16 of the clutch disk 15 and the coupling pawl 19 of the drive disk 17.

For embodying the power limiting device (power limiter) a hollow shaft 24 is arranged in the interior of the safety-belt reeling shaft 14. The interior of the hollow shaft 24 contains a torsion rod 25 as the actual power limiting means which torsion rod 25 at its ends is provided with toothings 26. At the side of the blocking device 11 of the safety-belt reeling device the torsion rod 25 with its toothing 26 is non rotatably connected to the hollow shaft 24 (FIG. 1) whereby the locking member 8 of the blocking device 11 is supported on the torsion rod 25. At the opposite end the torsion rod 25 is fixedly connected to the clutch disk 15 of the reeling shaft 14 via the corresponding toothing 26.

In this context an alternative embodiment should be mentioned, which is not represented in detail in the drawings. In this embodiment a separate clutch disk can be omitted and instead a unitary projection of the safety-belt reeling shaft can be provided that surrounds within the coupling plane the drive disk 17 and thus forms a clutch disk. Between the projection of the safety-belt reeling shaft 14 and the toothing 26 of the torsion rod 25 an intermediate ring is arranged which connects both parts so as to be non-rotatable relative to one another. The intermediate ring via corresponding toothings achieves the connection between the reeling shaft 14 and the torsion rod 25.

Figure 2:
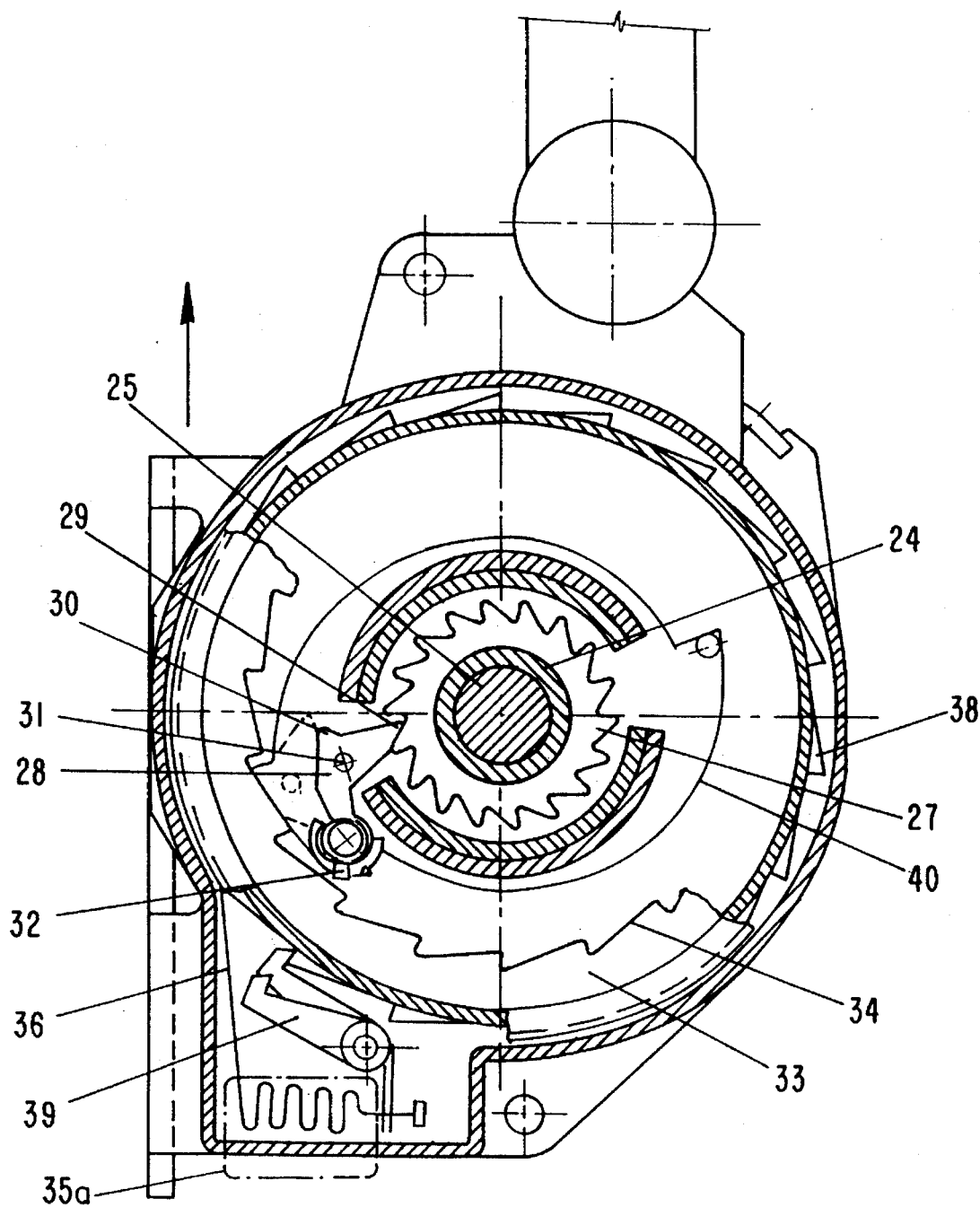
FIG. 2 shows the object of FIG. 1 in a side view looking onto the tightening device in partial section.

For providing a coupling according to FIG. 2 with respect to switching on and switching off the torsion rod 25, the hollow shaft 24 at the end facing the tightening device 12 is provided with a toothed ring 27 fixedly connected thereto. In the plane of the toothed ring 27 at a pivotable pawl 28 is pivotably connected to the clutch disk 15. The pawl 28 which is a coupling means between the coupling disk 15 and the hollow shaft 24 is pivotable supported. The pivotable pawl 28 has a first pawl tooth 29 for engaging the outer toothing of the ring 27 and at its outer rearward side is provided with a second tooth 30 for controlling the coupling action. Furthermore, the pivotable pawl 28 is provided with a radially extending control pin 31 loaded by a spring 32 having a dead center point.

With respect to the control of the pivotable pawl 28 and thus to the coupling action between the hollow shaft 24 and the clutch disk 15 a control ring 33 is arranged in the plane of the toothed ring 27 and the pawl 28. The control ring 33 surrounds the pawl 28 and is provided with an inner toothing 34. The inner toothing 34 cooperates with the second tooth 30 of the pivotable pawl 28, as will be described infra. The control ring 33 is rotatably supported within the housing cover 22. A cable drum 35 is integrated into the outer periphery of the control ring 33. The cable drum 35 has connected thereto a cable 36 which upon rotation of the control ring 33 is removed from the cable reserve 35a and wound onto the cable drum 35 of the control ring 33. A locking ring 37 is connected via shear pins 37a to the safety-belt reeling shaft 14 which locking ring 37 is provided with an outer toothing 38 that cooperates with a lever 39. The lever 39 can be activated upon removal of the cable 36 from the cable reserve 35a by the resulting tension of the cable 36 so that the lever 39 comes into engagement with the outer toothing 38 of the locking ring 37. The locking ring 37 has a guide 40 which cooperates with a control pin 31 of the pivotable pawl 28 so that via the guide 40 the pivotable pawl 28 is moved and controlled.

In the following the function of the safety-belt reeling device with tightening device and integrated power limiting device will be described with the aid of FIGS. 1 and 2.

During normal operation of the safety-belt reeling device, i.e., without activation of the tightening device, the hollow shaft 24 is connected with the engaged pivotable pawl 28 (it is possible to provide more than one, for example, two pawls that are oppositely arranged for this purpose) to the clutch disk 15 that rotates with the reeling shaft 14. When during this normal operation due to the belt-sensitive and/or vehicle-sensitive control mechanism at the blocking mechanism 11 of the safety-belt reeling device 10 a pivoting of the locking member 8 into the toothing 9 provided at the housing occurs, the resulting force of the locking member 8 is transferred from the blocking device 11 via the toothing 26 and the fixed connection between the torsion rod 25 and the hollow shaft 24 into the hollow shaft 24. From the hollow shaft 24 the force is transferred via the pivotable pawl 28, prestressed by the spring 32 with a dead center point and engaged in the toothing of the ring 27, to the clutch disk 15 and the reeling shaft 14. Accordingly, in this operational state the torsion rod 25 cannot operate as a power limiting device (power limiter).

When in the case of an accident the tightening device is activated and the drive cable 18 is removed from the drive disk 17, the clutch disk 15 with the safety-belt reeling shaft 14 are rotated together due to the engaged tightener coupling (coupling pawl 19, FIG. 5) in the winding direction of the safety-belt. The sudden rotational movement of the clutch disk 15 causes a movement of the pivotable pawl 28 (due to the resulting centrifugal forces) in the radial outward direction past the dead center point of the spring 32 so that the coupling action between the clutch disk 15 and the hollow shaft 24 is released. Accordingly, upon rotation of the drive disk 17 and the coupled clutch disk 15 with reeling shaft 14 the tightening forces are directly introduced into the reeling shaft 14. The torsion rod 25 that is rotationally fixed to the clutch disk 15 is rotated without any force being introduced into it so that the torsion rod 25 during the tightening process is not subjected to any occurring forces and cannot be damaged in any way.

Subsequent to the tightening process it is desired to have a limited removal of the safety belt. The torsion rod 25 should be active as a power limiting device over the length of this removal travel. This is possible due to the release of the coupling action between the clutch disk 15 and the hollow shaft 24 based on the radial outward movement of the pivotable pawl 28. When subsequent to the completion of the tightening movement a rotation of the reeling shaft 14 with clutch disk 15 in the removal direction of the safety-belt occurs by pulling at the safety-belt, the clutch disk 15, rotates only with the fixedly connected torsion rod 25, since a connection to the hollow shaft 24 is no longer present. The torsion rod 25 is connected fixedly to the locking member 8 of the blocking device 11 at the other end of the safety-belt reeling device 10 either directly or indirectly. The rotation of the reeling shaft 14 in the removal direction of the safety-belt thus results in a deformation force and the resulting force peaks are compensated by the torsion of the torsion rod 25 because the reeling shaft rotation is blocked by the blocking device 11 due to the activation of the locking member 8 into engagement with the toothing 9 at the housing.

During the aforementioned removal of the safety-belt the reversal of the rotational direction of the reeling shaft 14 in comparison to the just completed tightening movement causes the drive disk 17 which is coupled via the tightener coupling (19) to the clutch disk 15 to retract the driving cable 18 and the piston of the piston drive. This return movement, however, ends when the piston has reached its starting position. When during the tightening movement the piston has been displaced only over part of its possible travel distance, then the torsional path of the torsion rod 25 is limited accordingly. For this reason, after completion of the tightening movement a decoupling of the tightening device from the clutch disk 15 takes place so that the path of the torsion rod 25, which embodies the power limiting device, is independent of the drive path of the tightening device. In the embodiment represented in FIG. 1 the drive disk 17 with the coupling pawl 19 supported thereat is axially removed from the inner toothing 16 of the clutch disk 15 so that the coupling connection is released. Since the bushing 20 is fixed counter to the tightening direction, i.e., is fixed in the removal direction of the driving cable 18 from the drive disk 17, due to the presence of the ratchet 23, a return of the drive disk 17 results in its axial displacement along the bushing 20 counter to the force of the pressure spring 21 until the coupling connection is released. For this purpose the bushing 20 is provided with a trapezoidal thread.

Figure 5:
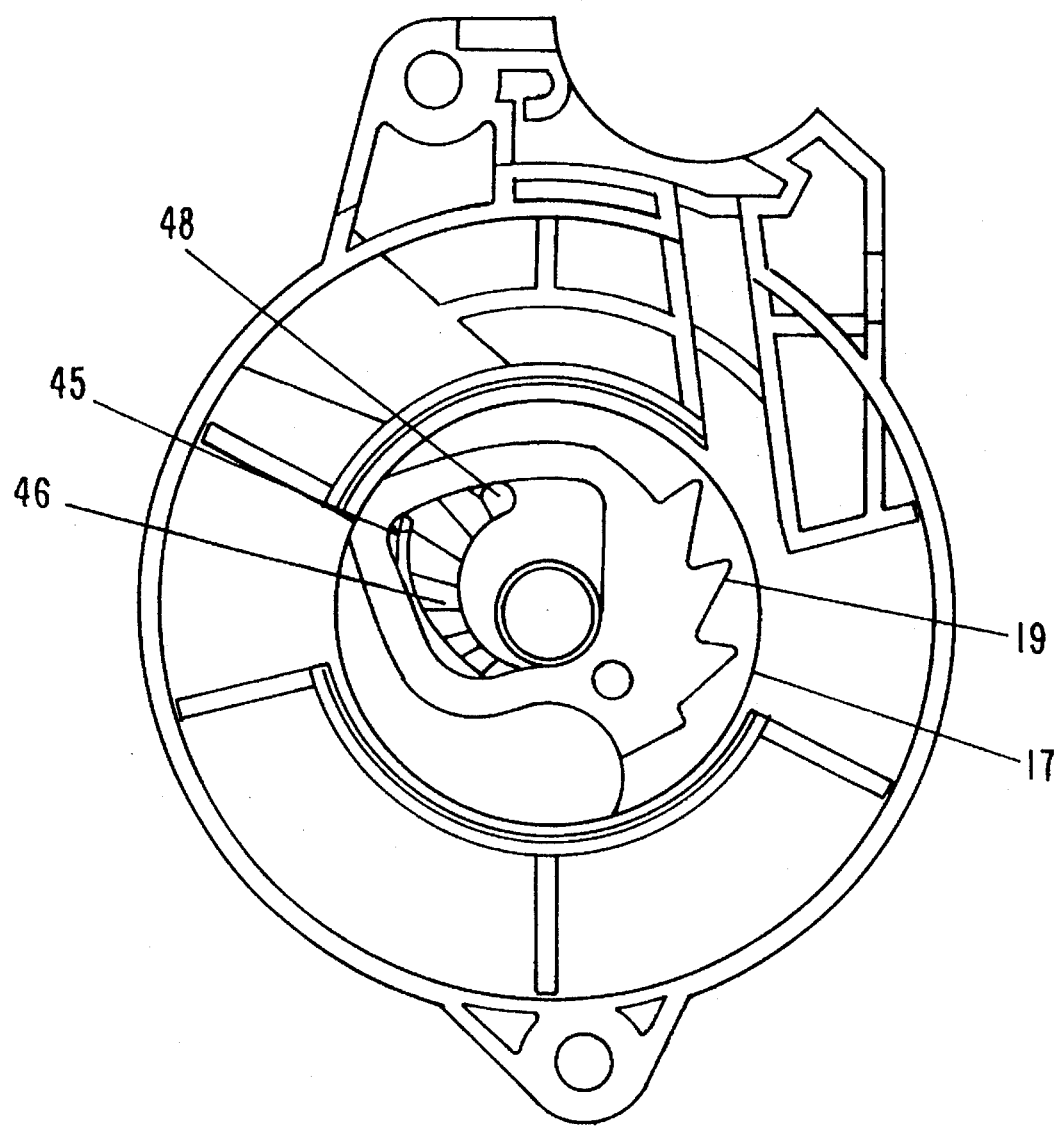
FIG. 5 shows an embodiment for releasing the coupling between the reeling shaft/clutch disk and the driving disk by return of the locking member.
Figure 6:
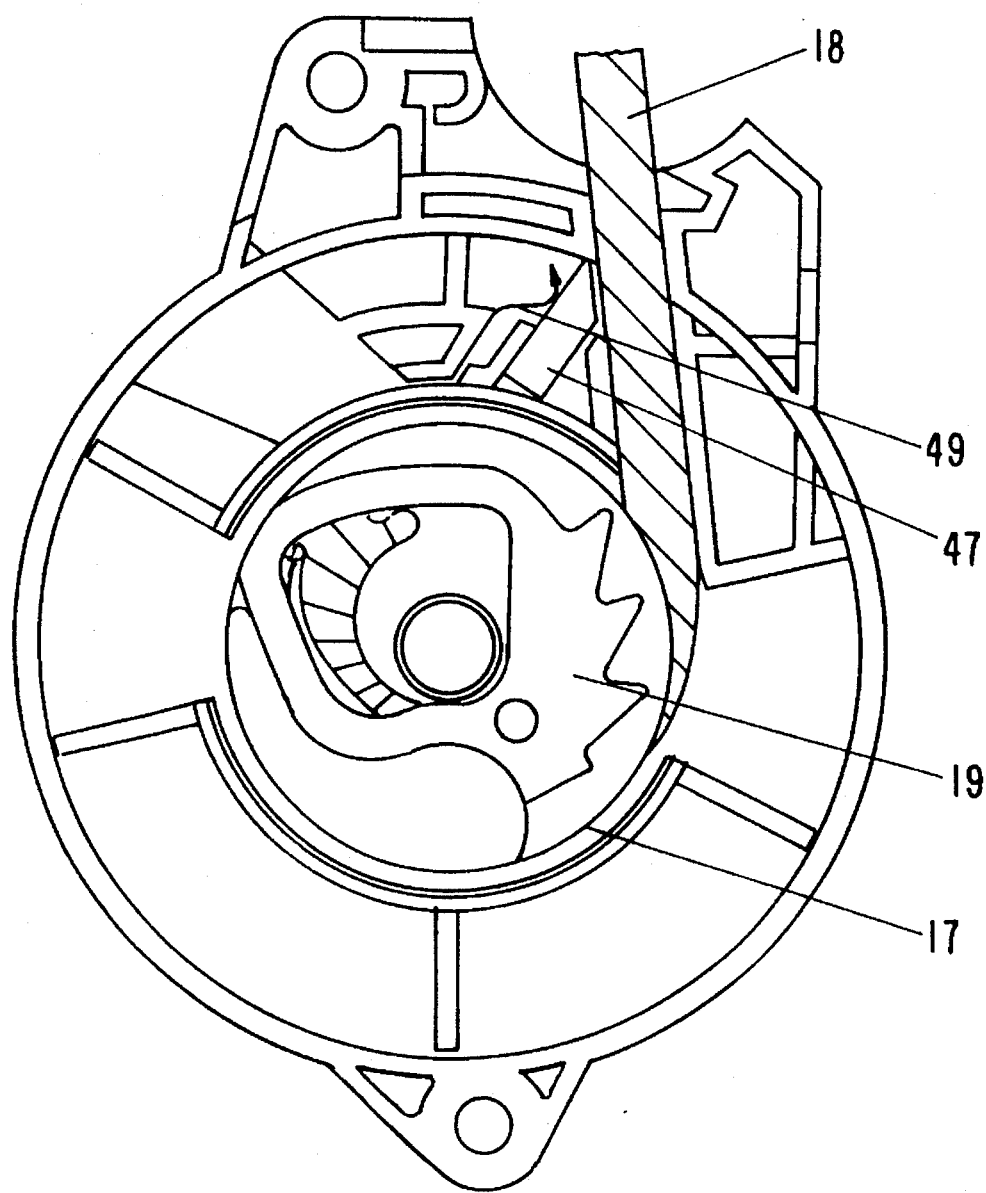
FIG. 6 shows another embodiment of the object of FIG. 5 with a cutting blade.

Alternative embodiments of this decoupling mechanism between the tightening drive (linear drive) and the safety-belt reeling device are represented in FIGS. 4 to 6 in a schematic representation which will be explained in the following.

FIG. 4 shows the release of the coupling in the area of the piston 42 of the piston drive guided within the cylinder 41 whereby the piston 42 is comprised of a guide part 43 and a clamping part 44 for the driving cable 18. The guide part 43 and the clamping part 44 are designed such that a pull on the driving cable 18 counter to the movement direction of the piston 42 within the cylinder 41 results in a release of the clamping action on the cable 18 in the area of the clamping part 44 so that the driving cable 18 via the return of the drive disk 17 connected to the clutch disk 15 can be retracted and cannot limit the rotational path.

Another embodiment is shown in FIG. 5. The coupling pawl 19 acting between the inner toothing 16 of the clutch disk 15 and the drive disk 17 can be disengaged from the inner toothing 16 with a spring 45 arranged at the drive disk 17. Upon return of the drive disk 17 the spring 45 is forced from its pre-stressed position (rest position 48) and is thus activated to return the coupling pawl 19 radially from the inner toothing 16 of the clutch disk 15. In this context it is important that the decoupling force for the coupling pawl 19 must be greater than the resistance of the piston 42 in the area of the tightening drive (linear drive).

Another alternative embodiment is represented in FIG. 6 according to which a spring-loaded (49) cutting blade 47 is arranged that upon return of the driving cable 18 is brought into contact with the driving cable 18 and thus cuts it.

The embodiment represented in FIGS. 1 and 2 also takes into consideration a limitation of the number of rotations to be performed by the torsion rod 25 when loaded in order to prevent an overload of the torsion rod 25, respectively, a too great forward movement of the passenger or driver secured by the safety-belt. For this purpose, it must be ensured that after a certain number of rotations of the reeling shaft 14 respectively, of the torsion rod 25, in the removal direction the coupling action between the clutch disk 15 and the hollow shaft 24 is again engaged so that the torsion rod 25 is again without effect with respect to its power-limiting function. For this purpose a control ring 33 is provided that can be coupled to the clutch disk 15 with the pivotable pawl 28. The control ring 33 is provided at its outer side with a cable drum to which a cable 36 is connected the length of which is stored as a cable reserve 35a. By rotating the clutch disk 15 and thus the control ring 33 with the cable drum since the pivotable pawl 28 engages the control ring 33, the cable 36, the length of which corresponds to the maximum allowed rotation of the torsion rod 25, is removed from the cable reserve 35a. The tension of the cable 36 which results at the end of the removal action loads the lever 39 which thus engages the outer toothing 38 of the locking ring 37. Since the locking ring 37 guides with its guide 40 the control pin 31 of the pivotable pawl 28, the pivotable pawl 28 is thus disengaged from the control ring 33 and is redirected into engagement with the toothed ring 27 of the hollow shaft 24. In this manner the connection between the clutch disk 15 and the hollow shaft 24 is again realized and a force transfer without the torsion rod 25 being involved can take place so that upon further loading of the safety-belt the torsion rod 25 is no longer loaded.

In this position it is also ensured that after completion of the forward movement of the passenger, the safety-belt reeling device 10 in itself is again functional. However, neither the tightening device nor the power limiting device can be activated again. The state into which the safety-belt reeling device 10 is returned after loading of the safety-belt reeling device corresponds to the initial state during normal operation.

Figure 3A:
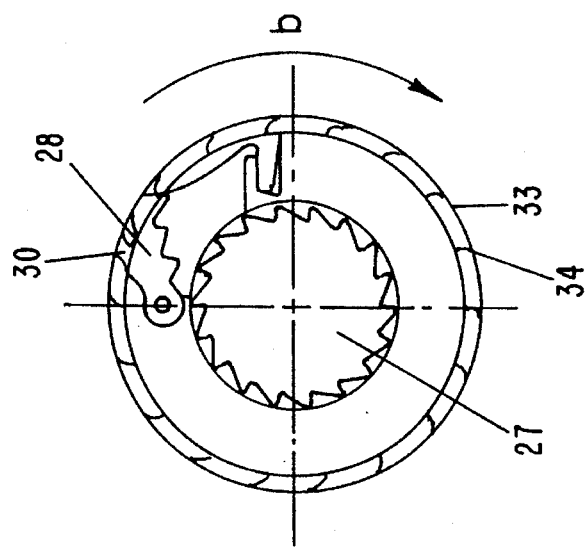
FIGS. 3a–3c show in a schematic representation the coupling between the hollow shaft and the reeling shaft/clutch disk in different operational stages.
Figure 3B:
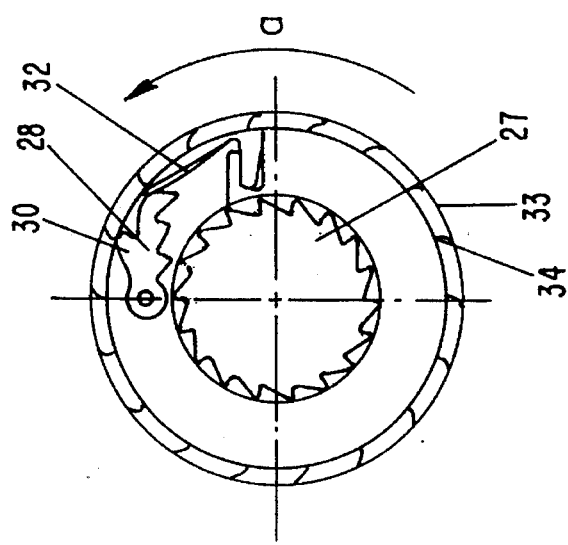
Figure 3C:
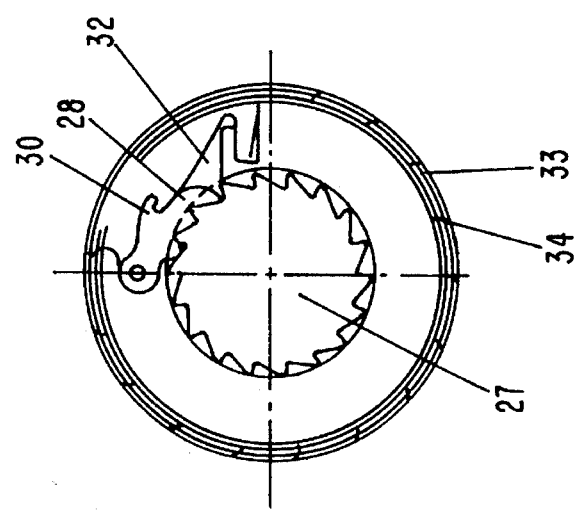

Since the limitation of the rotational movement of the torsion rod 25 and the resulting switching off via the control ring 33, the cable 36, and the locking ring 37 represent only an additional safety feature, which upon corresponding design of the device can be omitted, the FIGS. 3a to 3c show an embodiment of the invention in which after completion of the tightening movement only an engagement of the pivotable pawl 28 with the toothed ring 27 of the hollow shaft 24 takes place for coupling the hollow shaft 24 and the clutch disk 15. FIG. 3a shows the coupling engagement between the pawl 28 and the toothed ring 27 of the hollow shaft 24. The inner toothing 34 of the control ring 33 are embodied as ramps that have a slant in the direction of removal. FIG. 3b shows the tightening process (arrow a) in which the pawl 28 due to centrifugal forces is radially outwardly pivoted. In this position the pawl 28 with its outer side, especially the second tooth 30, moves along the ramp-like inner toothings 34 of the control ring 33. In this position the spring 32 with dead center point cannot exert any load in the radial outward direction. Thus, during the tightening process the coupling action between the hollow shaft 24 and the clutch disk 15, as described above, is released. FIG. 3c shows the state which results subsequent to the tightening movement upon removal of the safety-belt (arrow b). The spring 32 with dead center point now forces, due to the reversal of the rotational direction of the clutch disk 15, the pawl 28 with its second tooth 30 into engagement with the inner toothing 34 of the control ring 33 so that in this position the coupling action between the clutch disk 15 and the hollow shaft 24 is reliably released, as described above, and the control ring 33 rotates with the clutch disk 15.

When subsequent to the limited forward movement due to the winding movement of the reeling shaft the operational state of the safety-belt reeling device is reinstated, the movement of the reeling shaft in the direction indicated by arrow b in FIG. 3c results in the pawl 28 being forced out of engagement with the inner toothing 34 due to the ramp-like toothing whereby the resulting rotational movement is sufficient to overcome the dead center point of the spring 32 so that the spring 32 forces the pawl 28 into its initial position represented in FIG. 3a. This corresponds to the normal function of the safety-belt reeling device in which the torsion rod 25 is inactive as a power limiting device.

The features of the inventive object of this application disclosed in the above description, the claims, the abstract and the drawing may be important individually as well as in any desired combination for the realization of the invention in its various embodiments.

The present invention is, of course, in no way restricted to the specific disclosure of the specification and drawings, but also encompasses any modifications within the scope of the appended claims.

What we claim is:

1. A self-locking safety-belt reeling device comprising:
   a reeling shaft on which a safety-belt is wound;
   a blocking device controlled by at least one of a vehicle-sensitive control mechanism and a safety-belt-sensitive control mechanism for blocking said reeling shaft;
   a tightening device directly acting on said reeling shaft, said tightening device comprising a tightener coupling;
   said tightening device further comprising a drive disk, said drive disk, upon activation of said tightening device, driven in rotation by a drive device and coupled with said tightener coupling directly to said reeling shaft;
   a power limiter for allowing a limited removal of the safety belt in order to dissipate energy after activation of said tightening device and completion of the tightening movement;
   a coupling device between said power limiter and said reeling shaft for activating and deactivating said power limiter, wherein in an operational state of normal blocking with said blocking device without activation of said tightening device said power limiter is deactivated, in an operational state of activation of said tightening device and completion of the tightening movement said power limiter is activated, and, after completion of said tightening process and loading of said power limiter, said power limiter is deactivated.

2. A safety-belt reeling device according to claim 1, wherein said power limiter comprises a torsion rod with a first and a second end.

3. A safety-belt reeling device according to claim 2, wherein said coupling device couples said reeling shaft and said power limiter at said first end of said torsion rod, wherein said blocking device comprises a locking member and wherein said second end of said torsion rod is operatively connected to said locking member.

4. A safety-belt reeling device according to claim 3, further comprising a hollow shaft surrounding said torsion rod, wherein said second end of said torsion rod is fixedly connected to said hollow shaft and wherein said coupling device is a centrifugal coupling positioned between said hollow shaft and said reeling shaft.

5. A safety-belt reeling device according to claim 3, wherein said locking member is coupled to said torsion rod.

6. A safety-belt reeling device according to claim 3, wherein said locking member is coupled to said hollow shaft.

7. A safety-belt reeling device according to claim 4, wherein said coupling device is comprised of a ring having an outer toothing, said ring positioned on said hollow shaft, and a pivotable pawl connected to said reeling shaft so as to be positioned in a same plane as said ring with outer toothing.

8. A safety-belt reeling device according to claim 7, wherein under normal blocking conditions said pivotable pawl engages in an engaged position said outer toothing of said ring and wherein upon rotational acceleration of said reeling shaft, occurring during a tightening movement of said safety-belt, said pivotable pawl is moved into a disengaged position relative to said outer toothing of said ring.

9. A safety-belt reeling device according to claim 8, further comprising a spring with a dead center point connected to said pivotable pawl for biasing said pivotable pawl into engagement with said outer toothing of said ring, wherein, when said pivotable pawl is pivoted radially outwardly out of engagement with said outer toothing of said ring, said spring maintains said pivotable pawl in said disengaged position after surpassing said dead center point.

10. A safety-belt reeling device according to claim 7, wherein said pivotable pawl in said engaged position has minimal play.

11. A safety-belt reeling device according to claim 4, wherein said drive device is a linear tightener comprising a piston drive with a driving cable, said driving cable wound onto said drive disk and unwound from said drive disk with said piston drive upon actuation, wherein between said drive disk and said reeling shaft said tightener coupling is arranged, said tightener coupling comprising a clutch disk fixedly connected to one end of said reeling shaft, wherein said first end of said torsion rod is fixedly connected to said clutch disk and wherein said coupling device is arranged between said hollow shaft and said clutch disk.

12. A safety-belt reeling device according to claim 9, wherein after a limited safety-belt removal in conjunction with a load exerted on said power limiter, said power limiter is deactivated by returning said pivotable pawl into engagement with said outer toothing by overcoming said dead center point of said spring.

13. A safety-belt reeling device according to claim 12, wherein said tightening device comprises a housing and a control ring rotatably connected within said housing so as to be positioned within a plane of said pivotable pawl connected to said clutch disk, said control ring having an inner toothing cooperating with said pivotable pawl, and said inner toothing having ramps slanted in a direction of winding of said safety-belt.

14. A safety-belt reeling device according to claim 13, wherein said inner toothing of said control ring cooperates with said pivotable pawl such that said pivotable pawl in said direction of winding rests at said inner toothing of said control ring, whereby said spring has not yet reached said dead center point.

15. A safety-belt reeling device according to claim 13, wherein said pivotable pawl has an outer side facing said control ring, said outer side having a tooth which tooth in said direction of winding moves along said inner toothing and in a removal direction of said safety-belt engages a tooth of said inner toothing of said control ring.

16. A safety-belt reeling device according to claim 13, wherein said control ring comprises a cable drum to which a cable is connected with one end, said cable being stored in a cable reserve, wherein a length of said cable in said cable reserve is equivalent to a maximum number of rotations of said torsion rod.

17. A safety-belt reeling device according to claim 16, further comprising:
- a locking ring connected to said reeling shaft with shear pins;
- a lever controlled by a tension of said cable for locking said locking ring relative to said reeling shaft when rotating, said locking ring having a guide for a control pin connected to said pivotable pawl.

18. A safety-belt reeling device according to claim 17, wherein said tightener coupling between said drive disk and said clutch disk is disengaged upon completion of a tightening movement in a tightening direction such that a return of said clutch disk counter to said tightening direction is possible over an extended path.

19. A safety-belt reeling device according to claim 18, wherein said drive device is a pyrotechnical linear tightener comprising a piston drive with a driving cable, said driving cable wound onto said drive disk and unwound from said drive disk with said piston drive upon actuation, wherein between said drive disk and said clutch disk said tightener coupling in the form of a coupling pawl is arranged, such that said drive disk is axially displaceable relative to said clutch disk when said coupling pawl engages said clutch disk.

20. A safety-belt reeling device according to claim 19, further comprising a bushing with an outer thread having threads of a trapezoidal cross-section, wherein said drive disk comprises an inner thread and is connected to said outer thread of said bushing such that said bushing is turnable in a direction of removal of said driving cable and is fixed counter to said direction of removal.

21. A safety-belt reeling device according to claim 20, wherein said drive disk is connected to said bushing and is prestressed by a pressure spring into a coupling plane of said clutch disk.

22. A safety-belt reeling device according to claim 18, wherein said drive device is a linear tightener comprising a piston drive with a driving cable, said driving cable wound onto said drive disk and unwound from said drive disk with a piston drive upon actuation, wherein between said drive disk and said clutch disk of said reeling shaft said tightener coupling is arranged, wherein said piston drive comprises a piston comprised of a guide part and a clamping part for said driving cable, and wherein said guide part and said clamping part are releasable from one another upon pulling said driving cable counter to said tightening movement such that said driving cable is released from said piston.

23. A safety-belt reeling device according to claim 14, wherein said drive device is a linear tightener comprising a piston drive with a driving cable, said driving cable wound onto said drive disk and unwound from said drive disk with said piston drive upon actuation, wherein between said drive disk and said clutch disk of said reeling shaft said tightener coupling is arranged, wherein said tightener coupling comprises a coupling pawl that is pivotable radially into engagement into a corresponding inner toothing of said clutch disk, wherein a spring is connected to said coupling pawl for returning said coupling pawl into a release position for said clutch disk, wherein said spring is activated upon rotating said drive disk counter to a direction of removal of said driving cable.

24. A safety-belt reeling device according to claim 18, wherein said drive device is a linear tightener comprising a piston drive with a driving cable, said driving cable is wound onto said drive disk and unwound from said drive disk with said piston drive upon actuation, wherein between said drive disk and said clutch disk of said reeling shaft said tightener coupling is arranged, further comprising a spring-loaded cutting blade for said driving cable, wherein said cutting blade cuts said cable upon winding said driving cable.

25. A safety-belt reeling device according to claim 2, wherein said drive device is a linear tightener with a driving cable, said driving cable wound onto said drive disk and unwound from said drive disk with a piston drive upon actuation, wherein between said drive disk and said reeling shaft said tightener coupling is arranged, said tightener coupling comprising a clutch disk fixedly connected to said reeling shaft, said clutch disk being in the form of a projection of said reeling shaft surrounding said drive disk, wherein between said projection and said torsion rod an intermediate ring is positioned that connects said projection and said torsion rod so as to be non-rotatable relative to one another.

26. A safety-belt reeling device according to claim 2, wherein upon reaching a maximum number of rotations of said torsion rod said torsion rod is deactivated via said coupling device.

\* \* \* \* \*